United States Patent
Shimizu

(10) Patent No.: US 9,388,937 B2
(45) Date of Patent: Jul. 12, 2016

(54) STRUCTURE FOR FIXING ELECTRICAL JUNCTION BOX

(71) Applicant: Yazaki Corporation, Minato-ku (JP)

(72) Inventor: Masaru Shimizu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/200,538

(22) Filed: Mar. 7, 2014

(65) Prior Publication Data

US 2014/0183310 A1 Jul. 3, 2014

Related U.S. Application Data

(63) Continuation of application No. 13/520,922, filed as application No. PCT/JP2011/050211 on Jan. 7, 2011, now abandoned.

(30) Foreign Application Priority Data

Jan. 8, 2010 (JP) ................................. 2010-002862

(51) Int. Cl.
*H02G 3/08* (2006.01)
*F16M 13/02* (2006.01)
*B60R 16/023* (2006.01)
*H01M 2/20* (2006.01)
*H01M 2/10* (2006.01)
*H01M 2/34* (2006.01)

(52) U.S. Cl.
CPC ............ *F16M 13/02* (2013.01); *B60R 16/0238* (2013.01); *H01M 2/1027* (2013.01); *H01M 2/20* (2013.01); *H01M 2/348* (2013.01); *H01M 2/1072* (2013.01); *H01M 2200/103* (2013.01)

(58) Field of Classification Search
CPC .................................................. Y10S 248/906
USPC ............ 248/906; 174/50, 520, 535, 549, 551
See application file for complete search history.

(56) References Cited

U.S. PATENT DOCUMENTS

| 5,183,971 A | * | 2/1993 | Lafosse et al. ............. 174/138 F |
| 5,643,693 A | | 7/1997 | Hill et al. |
| 6,098,939 A | * | 8/2000 | He ............................. 248/205.1 |
| 6,396,380 B1 | | 5/2002 | Girke et al. |

(Continued)

FOREIGN PATENT DOCUMENTS

| CN | 1216633 A | 5/1999 |
| DE | 10330564 B4 | 1/2008 |

(Continued)

OTHER PUBLICATIONS

Office Action issued Jul. 16, 2013 by the Japanese Patent Office in corresponding Japanese Patent Application No. 2010-002862.

(Continued)

*Primary Examiner* — Steven Marsh
(74) *Attorney, Agent, or Firm* — Sughrue Mion, PLLC

(57) ABSTRACT

A structure for fixing an electrical junction box is provided which makes it possible to fix the same electrical junction box, irrespective of the sizes, shapes and the like of batteries, and to commonly use the electrical junction box. The structure includes a bracket including a junction box fixing part which fixes the electrical junction box and a battery fixing part which is fixed to the battery. The electrical junction box is fixed to the battery via the bracket.

5 Claims, 10 Drawing Sheets

(56) References Cited

U.S. PATENT DOCUMENTS

| | | | |
|---|---|---|---|
| 7,067,736 B1* | 6/2006 | Lemke | 174/50 |
| 7,402,918 B2* | 7/2008 | Ikeda et al. | 307/9.1 |
| 7,659,479 B2* | 2/2010 | Murphy | 174/58 |
| 8,622,755 B2* | 1/2014 | Takeuchi et al. | 439/76.2 |
| 8,701,911 B2* | 4/2014 | Youssef et al. | 220/4.02 |
| 8,704,107 B2* | 4/2014 | Laukhuf | 174/520 |
| 2004/0007375 A1 | 1/2004 | Higuchi et al. | |
| 2009/0108981 A1 | 4/2009 | Iwata et al. | |

FOREIGN PATENT DOCUMENTS

| | | | |
|---|---|---|---|
| DE | 102008053484 A1 | 5/2009 | |
| FR | 2877772 A1 | 5/2006 | |
| JP | 58186157 A | 10/1983 | |
| JP | 6448848 U | 3/1989 | |

OTHER PUBLICATIONS

International Search Report issued Mar. 1, 2011 in counterpart international application No. PCT/JP2011/050211.

Written Opinion issued Mar. 1, 2011 in counterpart international application No. PCT/JP/2011/050211.

Final Rejection, dated for Feb. 28, 2014, issued by the Japanese Patent Office in counterpart Japanese Application No. 2010-002862.

Communication dated Jun. 19, 2014 issued by the State Intellectual Property Office of P.R. China in counterpart Chinese Patent Application No. 201180005654.8.

Office Action dated Jun. 24, 2015, issued by the German Patent and Trade Mark Office in counterpart German Application No. 11 2011 100 211.4.

Office Action dated Jun. 15, 2015, issued by the State Intellectual Property Office of the People's Republic of China in counterpart Chinese Application No. 201180005654.8.

Communication from the State Intellectual Property Office of P.R. China dated Nov. 26, 2015 in a counterpart Chinese application No. 201180005654.8.

Communication issued Apr. 25, 2016, issued by the State Intellectual Property Office of the People's Republic of China in counterpart Chinese Patent Application No. 201180005654.8.

\* cited by examiner

STRUCTURE FOR FIXING ELECTRICAL JUNCTION BOX

CROSS-REFERENCE TO RELATED APPLICATIONS

This is a Continuation application of U.S. application Ser. No. 13/520,922, filed Jul. 6, 2012 which is a U.S. National Stage Application of PCT/JP2011/050211 filed Jan. 7, 2011, which claims priority to Japanese Patent Application No. 2010-002862, filed Jan. 8, 2010. The above-noted applications are incorporated herein by reference in their entirety.

TECHNICAL FIELD

The invention relates to a structure for fixing an electrical junction box which is directly attached to a battery post of a battery.

BACKGROUND ART

FIG. 10 shows a conventional structure for fixing an electrical junction box (refer to a Patent Literature 1). In FIG. 10, a battery post 51 is protruded and a plurality of fixing screw parts 52 are protruded on the top surface 50a of a battery 50. An electrical junction box 60 is provided with bus bars (not shown in the figure) to which a battery post connecting part (not shown in the figure) is attached, and a housing 61 which is arranged so that the bus bars are covered. Mounting parts 62 are provided in a plurality of positions of the housing 61.

The electrical junction box 60 is fixed to the top surface 50a of the battery 50 by fixing the battery post connecting part (not shown in the figure) to the battery post 51, and screwing nuts 70 into the fixing screw parts 52 which respectively penetrate through the mounting parts 62.

CITATION LIST

Patent Literature

[Patent Literature 1] US-B-5643693

SUMMARY OF INVENTION

Technical Problem

However, in the example of conventional structure for fixing the electrical junction box 60, when the fixed positions, the fixing means or the like of the electrical junction box 60 and the battery 50 are not matched, it is not possible to fix. Therefore, when the size, shape or the like of the battery 50 is different, even if the number of output terminals and the rated current value are the same, it is necessary to change the design of the electrical junction box 60 to be suitable for the fixed positions, the fixing means of the battery, and there is a problem that the electrical junction box 60 can not be commonly used.

Thus, the invention is made to solve the above described problem, and the object of the invention is to provide a structure for fixing an electrical junction box which makes it possible to fix the same electrical junction box, irrespective of the sizes, shapes and the like of batteries, and to commonly use the electrical junction box.

Solution to Problem

A first invention is a structure for fixing an electrical junction box which is fixed to a battery post of a battery, comprising:

a bracket including a junction box fixing part which fixes the electrical junction box and a battery fixing part which is fixed to the battery, wherein the electrical junction box is fixed to the battery via the bracket.

A second invention is the structure for fixing the electrical junction box according to the first invention, wherein the junction box fixing part includes a plurality of slide locking walls, and the electrical junction box is slidingly inserted into and fixed to the locking walls.

A third invention is the structure for fixing the electrical junction box according to the first invention or the second invention, wherein the battery fixing part has locking walls which are locked to side wall surfaces of the battery.

Advantageous Effects of Invention

According to the first invention, the same electrical junction box can be fixed to batteries whose sizes, shapes or the like are different, if the bracket is changed to have a battery fixing part which is suitable for the fixed positions and the fixing means of the batteries. Therefore, it is possible to fix the same electrical junction box, irrespective of the sizes, shapes and the like of batteries, and to commonly use the electrical junction box.

According to the second invention, in addition to the effect of the first invention, since the electrical junction box can be fixed only by being made to slide to the bracket, it is easy to mount the electrical junction box and the bracket.

According to the third invention, in addition to the effects of the first invention and the second invention, since the locking walls of the bracket are locked to the side wall surfaces of the battery, it is not necessary to additionally provide fixed parts for the brackets at the side of the battery.

DESCRIPTION OF EMBODIMENTS

Next, one embodiment of the invention is described based on the figures.

Figure 1:
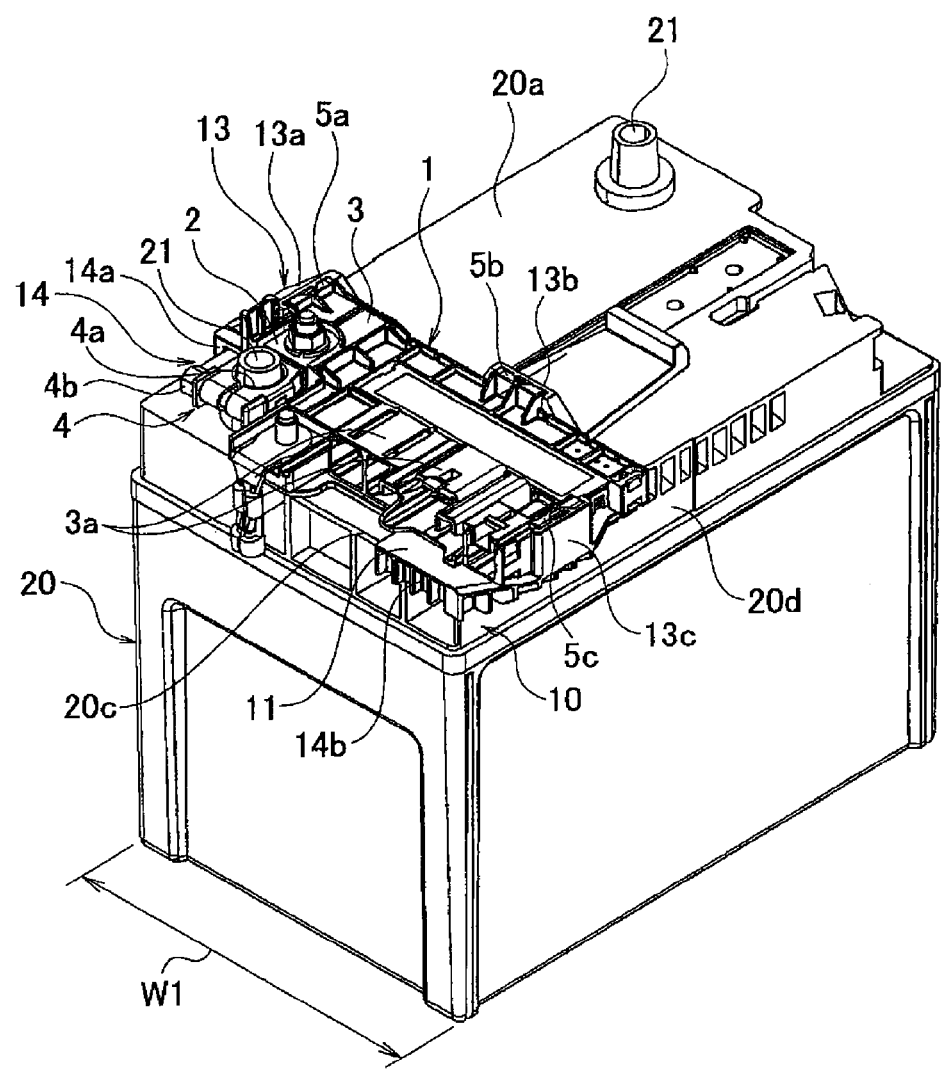
FIG. 1 shows one embodiment of the invention and is a perspective view which shows a structure for fixing a fusible link unit.
Figure 2:
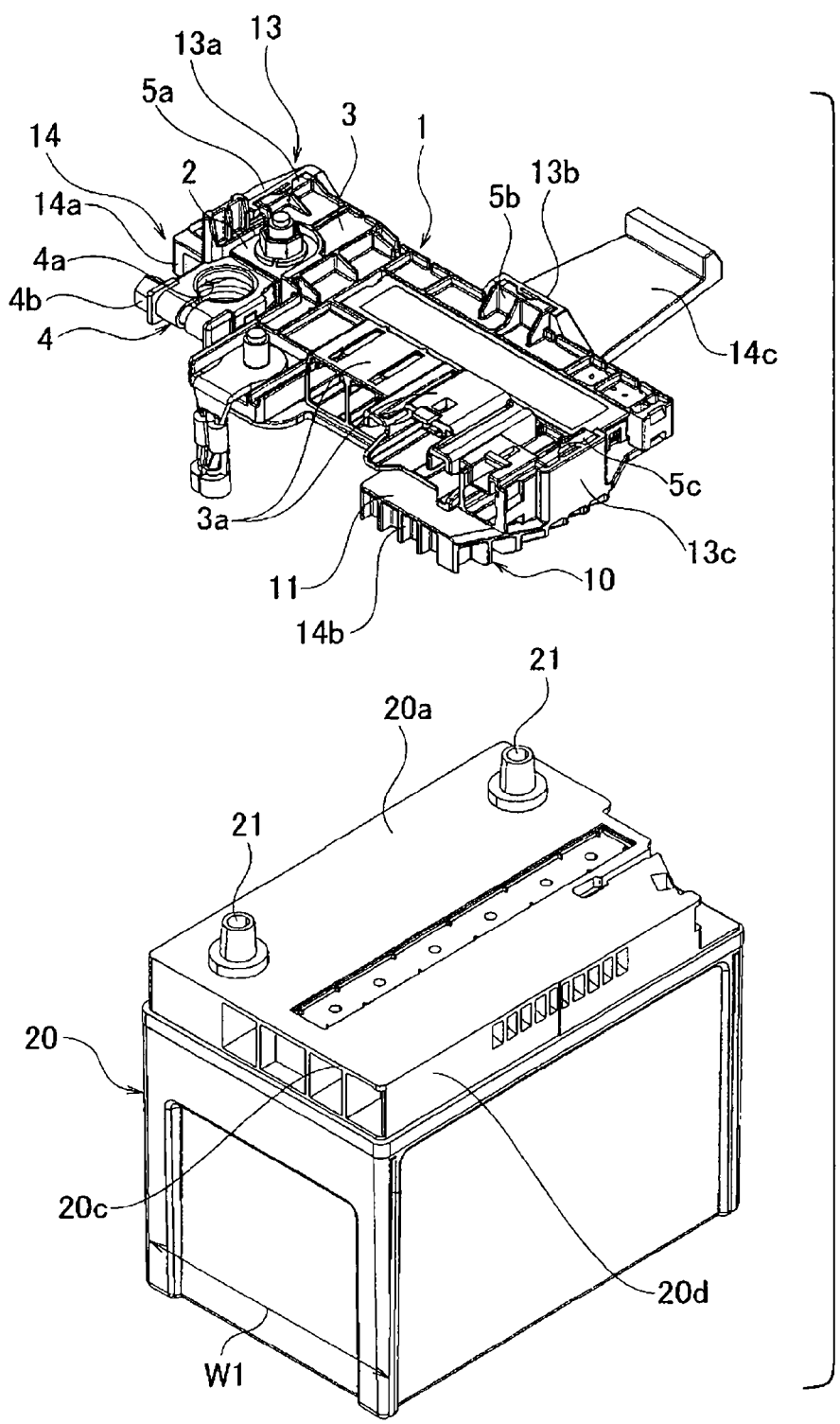
FIG. 2 shows the embodiment of the invention and is a perspective view of an assembly of the fusible link unit and a bracket, and a battery.
Figure 3:
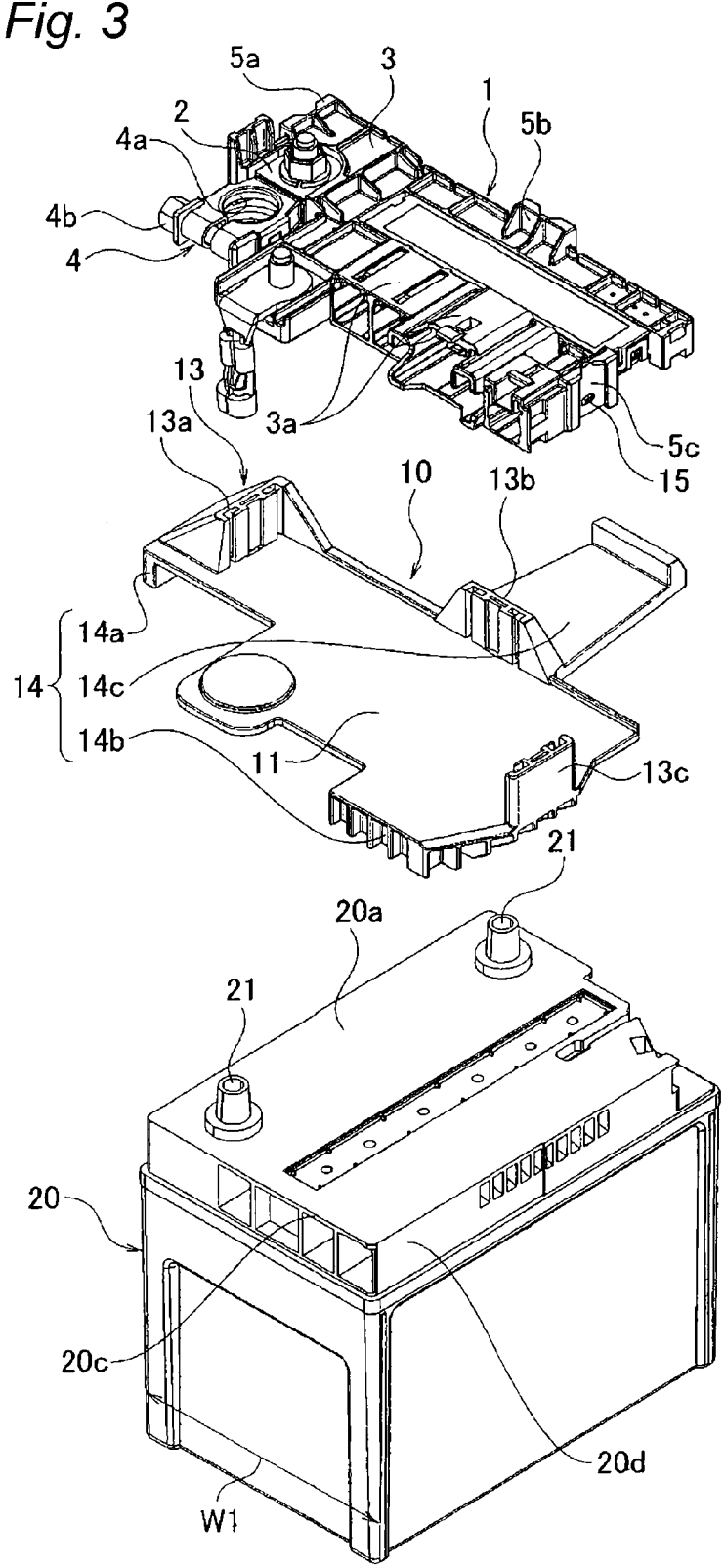
FIG. 3 shows the embodiment of the invention and is a perspective view of the fusible link unit, the bracket and the battery.
Figure 4:
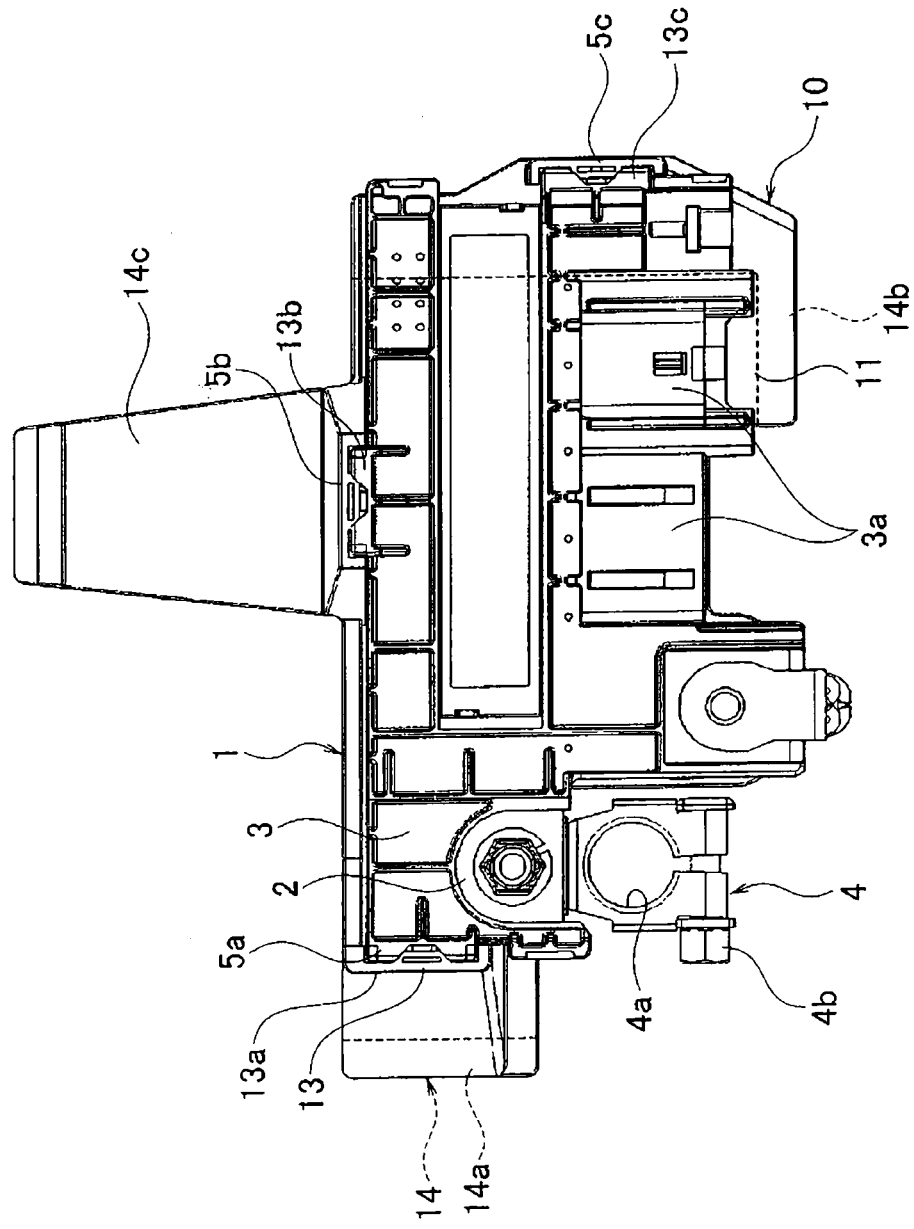
FIG. 4 shows the embodiment of the invention and is a top view which shows that the fusible link unit and the bracket are assembled.
Figure 5:
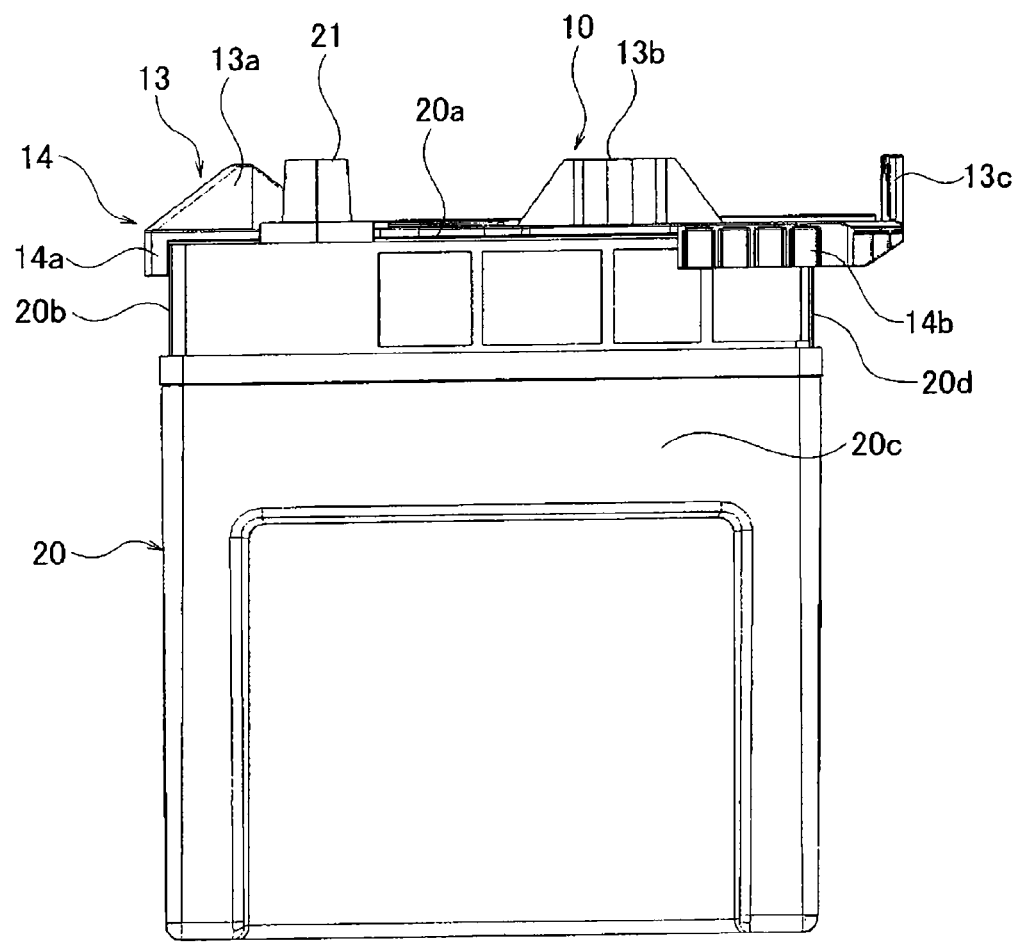
FIG. 5 shows the embodiment of the invention and is a side view of the bracket which is arranged on the battery.
Figure 6:
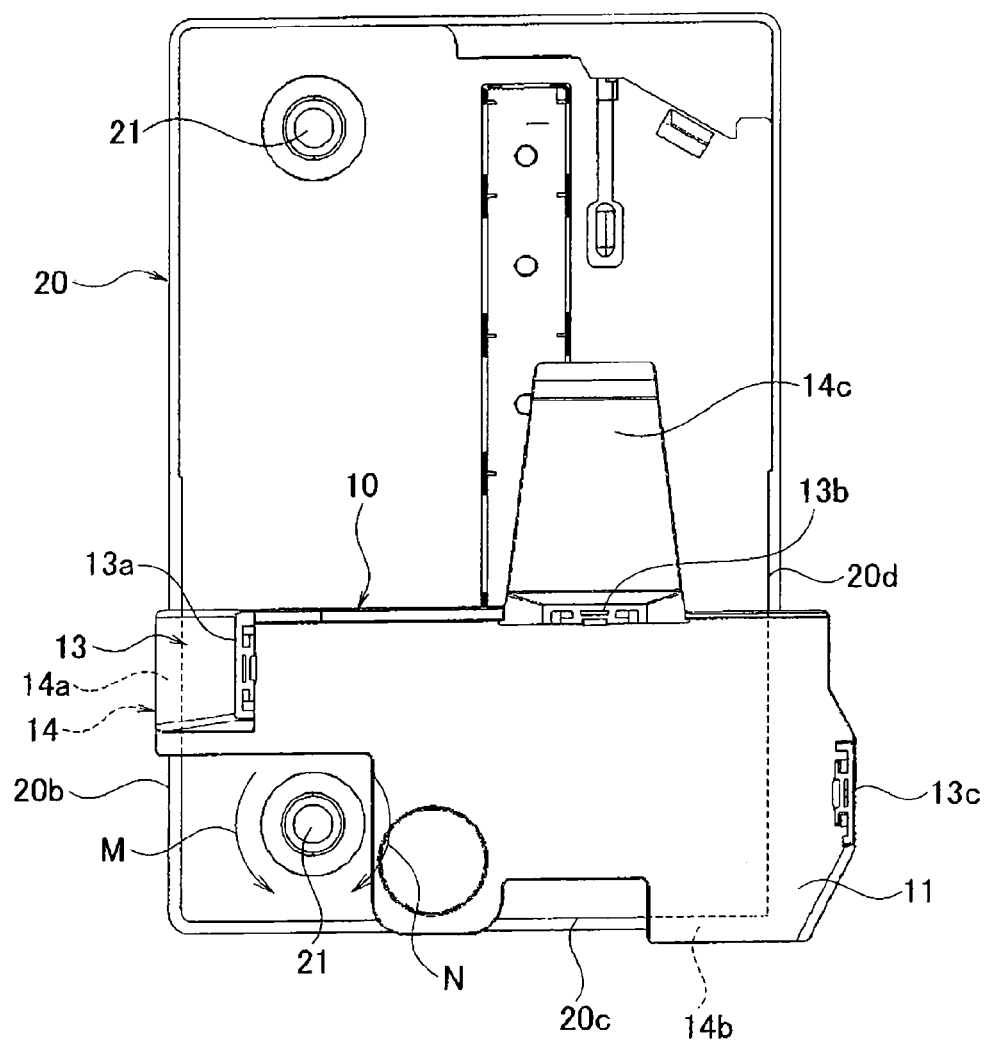
FIG. 6 shows the embodiment of the invention and is a top view of the bracket which is carried on the battery.

FIGS. 1 to 6 show one embodiment of the invention, in which FIG. 1 is a perspective view which shows a structure for fixing a fusible link unit 1, FIG. 2 is a perspective view of an assembly of the fusible link unit 1 and a bracket 10, and a battery 20, FIG. 3 is a perspective view of the fusible link unit 1, the bracket 10 and the battery 20, FIG. 4 is a top view which shows that the fusible link unit 1 and the bracket 10 are assembled, FIG. 5 is a side view of the bracket 10 which is arranged on the battery 20, and FIG. 6 is a top view of the bracket 10 which is carried on the battery 20.

In FIGS. 1 to 6, the fusible link unit 1 which is an electrical junction box is directly attached to a battery post 21, and is fixed to the top surface 20a which is a mounting surface of the battery 20 via the bracket 10.

The fusible link unit 1 is provided with a fusible link 2 which is formed of bus bars (not shown in the figures), and a housing 3 made of synthetic resin which is arranged so that the periphery of the fusible link 2 is covered. A battery post connecting part 4 is attached to the fusible link 2. The battery post connecting part 4 has a post insertion hole 4a and a fastening part 4b which can reduce the diameter of the post insertion hole 4a. When the battery post 21 which is inserted into the post insertion hole 4a is fastened by the fastening part 4b, the fusible link 2 is fixed to the battery post 21. That is, the fusible link 2 is directly attached to the battery post 21. A plurality of fusible parts (not shown in the figures) and a plurality of output terminals (not shown in the figures) are integrally formed in the fusible link 2.

A plurality of connector housing parts 3a which cover the periphery of the output terminals (not shown in the figures) are integrally formed in the housing 3. Connectors for wiring (not shown in the figures), which are connected to the side of loads, are installed to the connector housing parts 3a. Fixed parts 5a, 5b and 5c are provided at the side ends of the housing 3 in three directions. Each of the fixed parts 5a, 5b and 5c is provided with a flexible lock (not shown in the figures).

The battery 20 has a roughly cuboidal shape, and has a width of W1. A pair of battery posts 21 are protruded on the top surface 20a of the battery 20.

The bracket 10 is made of synthetic resin, and is provided with a bracket body 11 on which the fusible link unit 1 is carried, a junction box fixing part 13 which fixes the fusible link unit 1, and a battery fixing part 14 which is fixed to the battery 20.

The junction box fixing part 13 includes three slide locking parts 13a, 13b and 13c which are projected upwards from the side ends of the bracket body 11 in three directions.

The fixed parts 5a, 5b and 5c in three directions of the fusible link unit 1 are locked by being slidingly inserted into the slide locking parts 13a, 13b and 13c in three directions, respectively. In positions after the insertion, locking pawls 15 (shown in FIG. 3) of the fixed parts 5a, 5b and 5c of the fusible link unit 1 are locked by locking grooves (not shown in the figures) of the slide locking parts 13a, 13b and 13c. Therefore, the fusible link unit 1 is fixed to the bracket 10.

The slide locking parts 13a, 13b and 13c in three directions regulate the rotational displacement of the fusible link unit 1 around the battery post 21 as a fulcrum. That is, the slide locking parts 13a, 13b and 13c regulate the rotational displacement in one direction (the direction of M) around the battery post 21 as a fulcrum, and the slide locking parts 13a and 13c regulate the rotational displacement in the opposite direction (the direction of N) around the battery post 21 as a fulcrum.

The battery fixing part 14 includes locking walls 14a and 14b at two positions which are projected downwards from the bracket body 11, and a tongue-shaped locking part 14c which is extended towards the side of the bracket body 11. One locking wall 14a is locked to a side wall surface 20b of the battery 20. The other locking wall 14b is locked to side wall surfaces 20c and 20d of the battery 20 which are perpendicular to each other. The locking walls 14a and 14b at the two positions regulate the rotational displacement of the bracket 10 around the battery post 21 as a fulcrum. That is, the one locking wall 14a regulates the rotational displacement in the opposite direction (the direction of N) around the battery post 21 as a fulcrum. The other locking wall 14b regulates the rotational displacement in the one direction (the direction of M) around the battery post 21 as a fulcrum.

The tongue-shaped locking part 14c is arranged on the top surface 20a of the battery 20. A battery clamp (not shown in the figures) is arranged above the tongue-shaped locking part 14c. The tongue-shaped locking part 14c is clamped by the top surface 20a of the battery 20 and the battery clamp (not shown in the figures) in the up-down direction, and thus the displacement of the bracket 10 in the up-down direction is regulated.

In the above-mentioned composition, in order to fix the fusible link unit 1 to the battery 20, as shown in FIG. 2, the bracket 10 is first assembled to the fusible link unit 1. The assembling is performed by slidingly inserting the fixed parts 5a, 5b and 5c of the fusible link unit 1 into the slide locking parts 13a, 13b and 13c of the bracket 10, respectively. Next, the assembly of the fusible link unit 1 and the bracket 10 is carried on the top surface 20a of the battery 20 by inserting the battery post 21 into the post insertion hole 4a of the battery post connecting part 4. Thus, the locking walls 14a and 14b of the bracket 10 are locked, respectively to the side wall surfaces 20b, 20c and 20d in three directions of the battery 20. Next, when the battery clamp (not shown in the figures) is set on the top surface of the tongue-shaped locking part 14c of the bracket 10 and the battery post connecting part 4 is fixed to the battery post 21, the fixation is complete.

Figure 7:
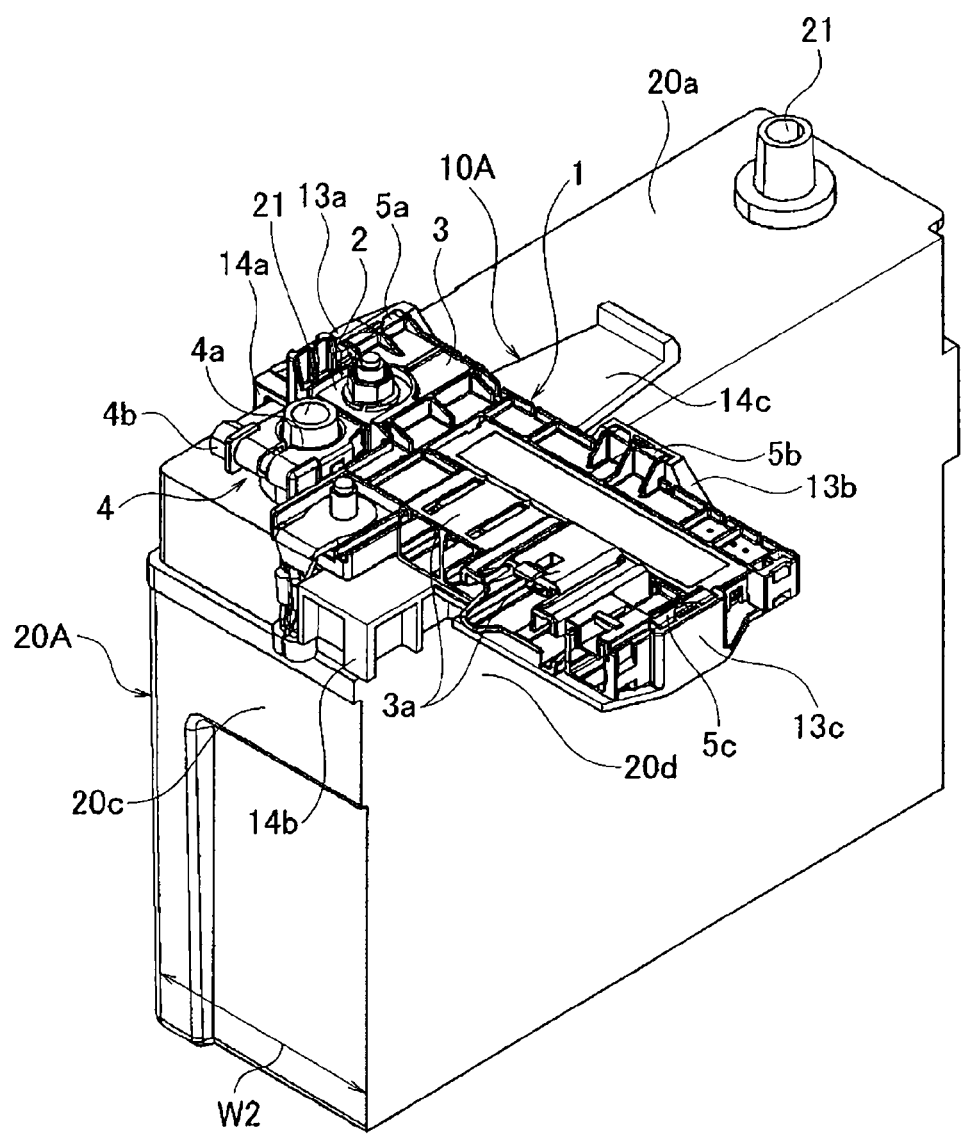
FIG. 7 is a perspective view in which the fusible link unit is fixed to a battery whose size is different.
Figure 8:
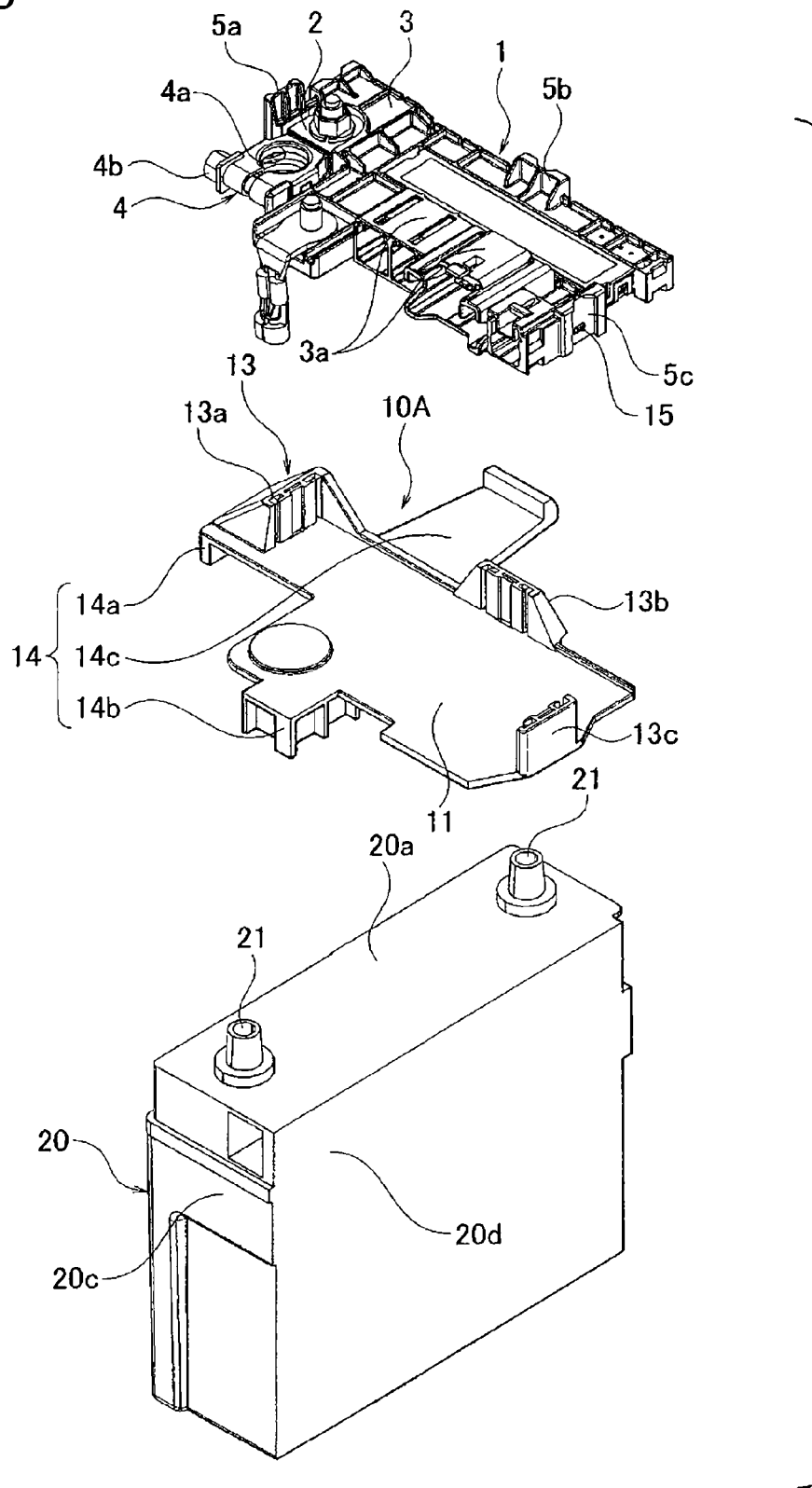
FIG. 8 is a perspective view of the fusible link unit, a bracket and the battery whose size is different.
Figure 9:
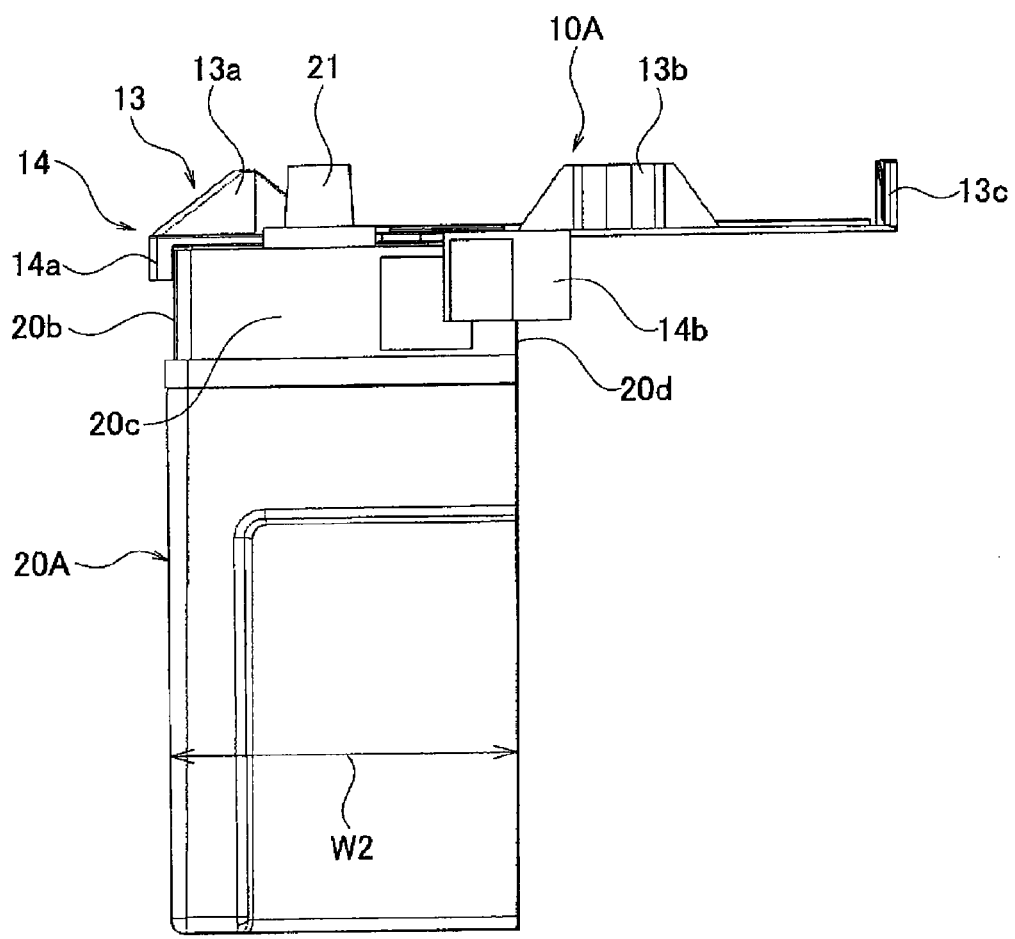
FIG. 9 is a side view of the bracket which is carried on the battery whose size is different.
Figure 10:
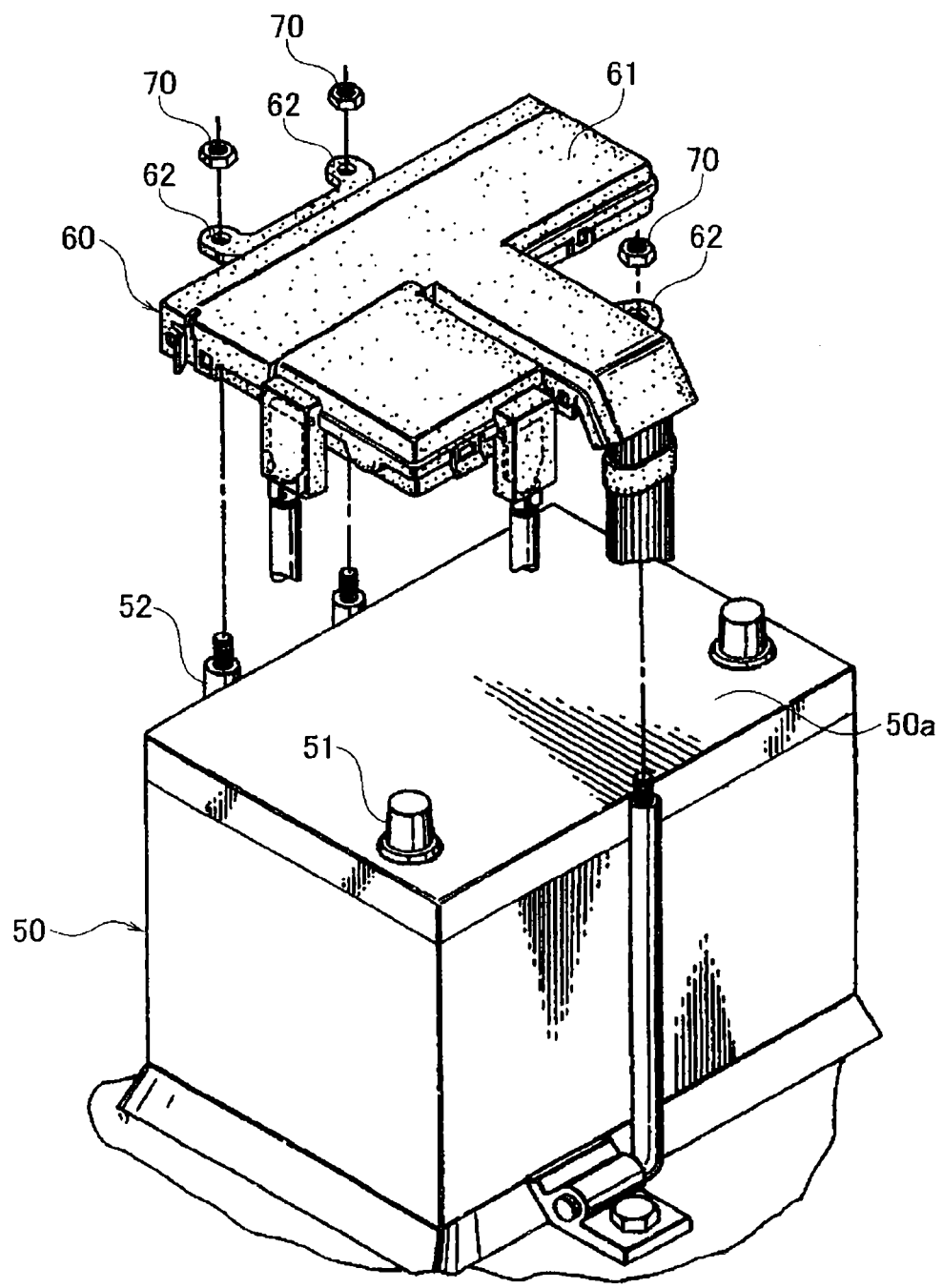
FIG. 10 is a perspective view which shows an example of a conventional structure for fixing an electrical junction box.

Next, the case is explained in which the above described fusible link unit 1 is fixed to a battery 20A whose width W2 is smaller than the width W1 of the above described battery 20 (W2<W1). FIGS. 7 to 9 show another embodiment of the invention, in which FIG. 7 is a perspective view in which the fusible link unit is fixed to a battery whose size is different, FIG. 8 is a perspective view of the fusible link unit, a bracket and the battery whose size is different, and FIG. 9 is a side view of the bracket which is carried on the battery whose size is different.

In FIGS. 7 to 9, a bracket 10A is used which has a structure different from that of the above described bracket 10. That is, the setting positions of three slide locking parts 13a, 13b and 13c and one locking wall 14a of the bracket 10A to be used are the same as those of the above described bracket 10, but the setting positions of the other locking wall 14b and the tongue-shaped locking part 14c are different. That is, the other locking wall 14b is made to fit the side wall surfaces 20c and 20d of the battery 20A whose width W2 is small, and is repositioned so that the other locking wall 14b can be locked to the side wall surfaces 20c and 20d. Similarly, the tongue-shaped locking part 14c is also made to fit the top surface of the battery 20A whose width W2 is small, and is repositioned so that the tongue-shaped locking part 14c can be carried on the top surface 20a.

In order to fix the fusible link unit 1 to the battery 20A, like the above described case, the bracket 10A is first assembled to the fusible link unit 1, and then the assembly of the fusible link unit 1 and the bracket 10A may be assembled to the top surface 20a of the battery 20A.

Although this example explained the case in which the sizes of the batteries 20 and 20A are different, when the shapes or the like of the batteries 20 and 20A are different, the same fusible link unit 1 can be similarly fixed by only changing the brackets 10 or 10A.

As explained above, the bracket 10 which has the junction box fixing part 13 which fixes the fusible link unit 1 and the battery fixing part 14 which is fixed to the battery 20 are provided, and the fusible link unit 1 is fixed to the batteries 20 or 20A via the bracket 10. Therefore, the same fusible link unit 1 can be fixed to the batteries 20 or 20A whose sizes, shapes or the like are different, if the brackets 10 or 10A are changed to have the battery fixing part 14 which is suitable for the fixed positions and the fixing means of the batteries 20 or 20A. Therefore, irrespective of the sizes, shapes or the like of the batteries 20 and 20A, the same fusible link unit 1 can be fixed and the fusible link unit 1 can be commonly used.

The slide locking parts 13a, 13b and 13c of the bracket 10 are fixed by slidingly inserting the fixed parts 5a, 5b and 5c of the fusible link unit 1. Therefore, it is easy to mount the fusible link unit 1 and the bracket 10 or 10A.

Since the battery fixing part 14 has the locking walls 14a and 14b which are locked to the side wall surfaces 20b, 20c and 20d of the batteries 20 or 20A, it is not necessary to additionally provide a fixed part for the bracket at the side of the batteries 20 or 20A.

Since the locking walls 14a and 14b are locked to the side wall surfaces 20b, 20c and 20d of the batteries 20 and 20A in three directions, the rotational displacement of the brackets 10 or 10A in both directions around the battery post 21 as a fulcrum can be definitely prevented. Therefore, without providing any fixed parts in the batteries 20 or 20A, the rotational displacement of the brackets 10 or 10A around the battery post 21 as a fulcrum can be prevented.

For example, when an external connector (not shown in the figures) are inserted into or pulled out of the connector housing part 3a, a rotational force around the battery post 21 as a fulcrum acts on the fusible link unit 1 and the brackets 10 or 10A. The slide locking parts 13a, 13b and 13c in three directions definitely prevent the rotational displacement of the fusible link unit 1 around the battery post 21 as a fulcrum, and the locking walls 14a and 14b in two directions definitely prevent the rotational displacement of the brackets 10 or 10A in both directions around the battery post 21 as a fulcrum.

Since the battery fixing part 14 has the tongue-shaped locking part 14c, the displacement of the brackets 10 or 10A in the up-down direction can be definitely prevented by the tongue-shaped locking part 14c.

In the embodiments, the case is explained in which the electrical junction box is the fusible link unit 1, but it is needless to say that the invention is also applicable to electrical junction boxes other than the fusible link unit 1.

Although the present invention is described in detail with reference to the embodiments, it is apparent that various modifications and amendments may be made by those skilled in the art without departing from the spirit and scope of the invention.

This application is based on the Japanese patent application (patent application 2010-002862) filed on Jan. 8, 2010, whose content is incorporated herein by reference.

REFERENCE SIGNS LIST 1 fusible link unit (electrical junction box)
5a, 5b, 5c fixed part
10 or 10A bracket
13 junction box fixing part
13a, 13b, 13c slide locking wall
14 battery fixing part
14a, 14b locking wall
20, 20A battery
20a top surface (mounting surface)
20b, 20c, 20d side wall surface
21 battery post

The invention claimed is:

1. A structure for fixing an electrical junction box which is configured to be fixed to a battery post of a battery, comprising:
a bracket including a junction box fixing part which fixes the electrical junction box and a battery fixing part which is configured to be fixed to the battery,
wherein the electrical junction box is configured to be fixed to the battery via the bracket, as a result of being fixed the bracket is positioned in between the battery and the electrical junction box in a fixing direction;
wherein the battery fixing part has locking walls which project downwardly in the fixing direction from the bracket toward the battery and are positioned on different sides of the bracket,
wherein the locking walls are configured to be locked to and in contact with side wall surfaces of the battery on different sides of the battery,
wherein the bracket has a lower surface which is adjacent to an upper surface of the battery in the fixing direction as a result of the battery fixing part being fixed to the battery, and
wherein the locking walls of the battery fixing part project downwardly in the fixing direction from the lower surface of the bracket, the lower surface of the bracket being below the junction box fixing part in the fixing direction.

2. The structure for fixing the electrical junction box according to claim 1,
wherein the junction box fixing part includes a plurality of slide locking walls, and the electrical junction box is slidingly inserted into and fixed to the plurality of slide locking walls.

3. The structure for fixing the electrical junction box according to claim 1,
wherein the different sides of the bracket are perpendicular to each other, and the side wall surfaces of the battery are perpendicular to each other.

4. The structure for fixing the electrical junction box according to claim 1,
wherein the junction box fixing part extends upwardly in the fixing direction from the bracket, in a direction opposite to a downward direction in the fixing direction in which the battery fixing part extends.

5. The structure for fixing the electrical junction box according to claim 4,
wherein the junction box fixing part extends upwardly from a first surface of the bracket and the battery fixing part extends downwardly from the lower surface of the bracket.

* * * * *